(12) United States Patent
Milding et al.

(10) Patent No.: US 10,787,095 B2
(45) Date of Patent: Sep. 29, 2020

(54) METHOD AND SYSTEM FOR PROVIDING AN ADVICE TO AN OCCUPANT OF AN ELECTRICAL VEHICLE

(71) Applicant: Volvo Car Corporation, Gothenburg (SE)

(72) Inventors: Hans Göran Milding, Kullavik (SE); Robert Eriksson, Halta (SE)

(73) Assignee: Volvo Car Corporation, Gothenburg (SE)

( * ) Notice: Subject to any disclaimer, the term of this patent is extended or adjusted under 35 U.S.C. 154(b) by 54 days.

(21) Appl. No.: 16/199,639

(22) Filed: Nov. 26, 2018

(65) Prior Publication Data

US 2019/0186932 A1 Jun. 20, 2019

(30) Foreign Application Priority Data

Dec. 18, 2017 (EP) .................................. 17207884

(51) Int. Cl.
*H02J 7/00* (2006.01)
*B60L 58/13* (2019.01)
(Continued)

(52) U.S. Cl.
CPC .............. *B60L 58/13* (2019.02); *B60L 53/60* (2019.02); *B60L 58/12* (2019.02);
(Continued)

(58) Field of Classification Search
USPC ......................................................... 320/109
See application file for complete search history.

(56) References Cited

U.S. PATENT DOCUMENTS

2010/0288569 A1* 11/2010 Fish ........................ B60L 53/80
180/65.29
2012/0306446 A1 12/2012 Suganuma et al.
(Continued)

FOREIGN PATENT DOCUMENTS

DE 102014214806 A1 * 2/2016 .............. B60L 53/60
WO 2015153140 A1 10/2015

OTHER PUBLICATIONS

May 25, 2018 European Search Report issue on International Application No. EP17207884.

*Primary Examiner* — Samuel Berhanu
(74) *Attorney, Agent, or Firm* — Clements Bernard Walker; Christopher L. Bernard (57) ABSTRACT

Method for providing advice to an occupant of an electrical vehicle comprising at least one electrical energy storage, comprising the following steps: estimate an energy usage for a planned traveling path between a first (A) and a second (B) location, determine if there is a need to recharge, and when there is: identify at least one point of interest ($POI_1$) which can be reached by a current amount of electrical energy, wherein the at least one point of interest ($POI_1$) comprises at least one recharging station, provide an advice to stop at the at least one point of interest ($POI_1$) for recharging, and further provide an instruction to recharge to a first state of charge level ($SOC_1$), wherein the first state of charge level ($SOC_1$) is such that the second location (B) or at least one other point of interest can be reached with a state of charge safety margin.

14 Claims, 3 Drawing Sheets

(51) Int. Cl.
*G01C 21/34* (2006.01)
*B60L 53/60* (2019.01)
*G01C 21/36* (2006.01)
*B60L 58/12* (2019.01)

(52) U.S. Cl.
CPC ..... *G01C 21/3469* (2013.01); *G01C 21/3682* (2013.01); *G01C 21/3697* (2013.01); *B60L 2240/62* (2013.01); *B60L 2250/16* (2013.01); *B60L 2250/30* (2013.01); *B60L 2260/52* (2013.01)

(56) References Cited

U.S. PATENT DOCUMENTS

| | | | |
|---|---|---|---|
| 2014/0074320 A1* | 3/2014 | Nishida | B60R 16/0232 701/2 |
| 2014/0340048 A1 | 11/2014 | Tateno et al. | |
| 2016/0363456 A1 | 12/2016 | Pujos et al. | |
| 2017/0138750 A1 | 5/2017 | Weber | |
| 2018/0105053 A1* | 4/2018 | Ahmed | B60L 11/1833 |

* cited by examiner

METHOD AND SYSTEM FOR PROVIDING AN ADVICE TO AN OCCUPANT OF AN ELECTRICAL VEHICLE

CROSS-REFERENCE TO RELATED APPLICATION

The present patent application/patent claims the benefit of priority of co-pending European Patent Application No. 17207884.2, filed on Dec. 18, 2017, and entitled "METHOD AND SYSTEM FOR PROVIDING AN ADVICE TO AN OCCUPANT OF AN ELECTRICAL VEHICLE," the contents of which are incorporated in full by reference herein.

TECHNICAL FIELD

The present disclosure relates to a method and a system for providing an advice to an occupant of an electrical vehicle. Moreover, the present disclosure relates to a computer program and an electrical vehicle which comprises the method and/or the system.

BACKGROUND

Electrical vehicles, including HYBRID and PURE electrical vehicles, are becoming more and more popular, especially due to environmental aspects. These vehicles are typically equipped with high power, high voltage, energy storages for powering an electrical motor which is used for propulsion of the vehicle.

One concern with the high power energy storages, such as lithium ion battery cells, is that they are costly and comprise a large amount of the total value of the electrical vehicle. This in turn leads to that the state of health (SOH) of the energy storage may largely affect the residual value of the electrical vehicle. Today the residual value of an electrical vehicle is commonly relatively low due to the anxiety of the SOH of the energy storage. An effect of the relatively low residual value is that the total cost of ownership (TCO) for the owner of the electrical vehicle may become high, and sometimes even too high.

Therefore there is a need for reducing the impact the high power energy storage has on the residual value of the vehicle in order to reduce the TCO for the owner of the vehicle.

SUMMARY

In view of the above, an object of the present invention is to provide a method and a system which overcomes, or at least partially overcomes, at least some of the disadvantages of the prior art. Additionally, an object of the present invention is to provide a method and a system which may support and give advices to an occupant of the vehicle in order to improve the occupant's decision making to thereby avoid an unnecessary deterioration of the SOH of an electrical energy storage of an electrical vehicle.

The above mentioned and other objects are at least partially provided by the subject matter as specified in the independent claims. Preferred and advantageous embodiments can be found in the depending claims and in the accompanying description and drawings.

According to a first aspect of the invention, the objects are at least partially provided by a method for providing an advice to an occupant of an electrical vehicle comprising at least one electrical energy storage, wherein the method comprises the following steps:

S11) estimate an energy usage of the at least one electrical energy storage for a planned traveling path for the electrical vehicle between a first and a second location and therefrom:

S12) determine if there is a need to recharge the at least one electrical energy storage along the planned traveling path, and when there is a need for recharging:

S2) identify at least one point of interest for the occupant between the first and the second location which can be reached by a current amount of electrical energy in the at least one electrical energy storage, wherein the at least one point of interest comprises at least one recharging station, S3) provide an advice to the occupant to stop at the at least one point of interest for recharging the at least one electrical energy storage, and further provide an instruction to recharge to a first state of charge level, wherein the first state of charge level is such that the second location or at least one other point of interest for the occupant along the planned traveling path can be reached with a state of charge safety margin.

Optionally, the first state of charge level may also be lower than a 100%, or full charge, state of charge level.

That the at least one point of interest comprises at least one recharging station means herein that there is at least one recharging station nearby the at least one point of interest, such as less than 500, 400, 300, 200, 100 or 50 meters away from the at least one point of interest. Still optionally, in a preferred embodiment, the at least one point of interest is selected as one point of interest which is located along the planned travelling path. More precisely, if the point of interest is located nearby the planned traveling path, an improved driving experience may be provided since it will avoid detours for recharging. A point of interest being located along the planned traveling path may be defined as a point of interest that is located within 2000, 1000, 900, 800, 700, 600, 500, 400, 300, 200 or 100 meters from the planned traveling path.

The term "advice" herein means that information is provided to the occupant, which is for example provided by a visual message on a display and/or by an audio message via loudspeakers. An advice shall be seen as optional to the occupant, i.e. it is a message comprising proposed instructions which may be followed or not by the occupant.

Optionally, the other point of interest for the occupant may be an other subsequent point of interest along the planned traveling path.

The inventors have realized that there is a need to support an occupant, such as a driver, of the vehicle in order to prevent an unnecessary deterioration of the SOH of the at least one electrical energy storage. With the above mentioned method, an unnecessary SOH deterioration may be avoided since the at least one electrical energy storage will only be charged to a state of charge (SOC) level which is sufficient to reach the final destination or another point of interest for the occupant further down the planned traveling path. Especially, the method may avoid that the at least one electrical energy storage is charged to a 100% SOC level, which should be avoided as often as possible since that may negatively affect the SOH of the at least one electrical energy storage. Moreover, by providing an advice to stop for recharging at a point of interest for the occupant, a more pleasant and convenient trip may be achieved. A point of interest for the occupant may be defined as a preferred location, i.e. such as a location comprising a preferred restaurant, a preferred shop, a work place or the like, for the occupant. Therefore, with the present invention, the experience of owning or using an electrical vehicle may be improved. More particularly, the TCO may be reduced and also the experience for the occupant when using the electrical vehicle may be improved.

A state of health (SOH) is something which is well known by the skilled person, and refers to the health of the energy storage which deteriorates over time depending on factors as usage, recharging pattern, ambient temperature etc. Thus, an energy storage which has been used for a period of time is not able to store as much energy as a new non-used energy storage, and therefore the SOH of the used energy storage has deteriorated compared to when it was new.

The at least one electrical energy storage may be any type of high power, high voltage, energy storage that can be used for powering an electrical motor for propulsion of the vehicle. A high voltage electrical energy storage may for example be an energy storage having a voltage level from 48, 60, 100, 200, 300 or 400 Volts. A typical example of such energy storages are battery packs comprising lithium ion battery cells.

Optionally, the at least one point of interest for the occupant may be a predetermined location which has been preselected by the occupant. Thereby, the occupant may beforehand select which type of locations that are preferred and may thereby get a more convenient driving experience when using the vehicle. Preselected may be defined as selected at least before the trip along the planned traveling path has commenced. Still optionally, the method may comprise the step of storing in a memory a plurality of points of interest for the occupant as an occupant profile. Thus, the occupant may preselect a plurality of preferred locations, comprising preferred restaurants, shops, place of work etc., which then may be used when identifying points of interest along the planned traveling path. The preferred locations may also be linked to factors such as where the occupant prefers to shop, if the occupant likes coffee, which types of hotels that are preferred, which types of interests the occupant has etc. Still optionally, a plurality of different occupant profiles may be stored in the case the vehicle is to be used by more than one occupant. Moreover, in this example embodiment, the method may further include a step of identifying which occupant is using the vehicle before identifying a point of interest along the planned traveling path.

Optionally, the at least one point of interest for the occupant may be a predetermined location which has been identified in that the occupant has previously stopped the electrical vehicle at that location. In other words, the method may comprise an adaptive function which may learn over time about the specific occupant behavior. Just as a matter of example, stopping only one time at a specific location may not be enough for storing that location. In one example, the at least one point of interest may be identified in that the vehicle has stopped at the specific location more than one time. Still further, any identified or preselected point of interest may be deselected by the occupant if for instance the occupant has changed his/her behavior over time.

Optionally, the at least one point of interest for the occupant may be a point of interest which has been identified in that an occupant calendar comprises a scheduled meeting/appointment at a specific location. An occupant calendar may be a virtual calendar stored in a memory unit, such as in a memory unit of a mobile device, such as a smartphone or the like. Thereby, an even further improved driving experience may be obtained since the advice provided to the occupant may be linked to the locations corresponding to the scheduled meetings/appointments. Still further, a reduced SOH deterioration may also be obtained.

Optionally, the at least one point of interest may be linked to an occupant shopping list. Such a shopping list may e.g. comprise information regarding different products/supplies that shall be purchased, which in turn may be linked to specific locations where such products/supplies may be purchased. Thereby, the advice provided to the occupant may lead to an even further improved driving experience and a reduced SOH deterioration. The shopping list may for example be stored in a memory unit, such as in a memory unit of a mobile device, such as a smartphone or the like.

Optionally, the method may further provide a message to the occupant comprising a current and/or a future SOH, wherein the future SOH is based on the planned traveling path. Thereby the occupant may obtain information on the SOH and also a change of SOH based on for example different traveling paths/decisions. This in turn may support the occupant in making better decisions in order to not reduce the SOH more than necessary.

Optionally, the first state of charge level may be 95% or less, 90% or less, 85% or less, preferably 80% or less, of a full state of charge level. Thereby, a reduced deterioration of the SOH of the at least one electrical energy storage may be avoided since it has been realized that charging the electrical energy storage to a too high level may be negative for SOH. Still optionally, the first state of charge level may be such that the second location or the other point of interest along the traveling path can be reached without reducing the state of charge level to a level of 30% or below, 25% or below, 20% or below, 15% or below or 10% or below, of a full state of charge level.

Optionally, the identified at least one point of interest may further be a point of interest which can be reached without reducing the state of charge level to a level of 30% or below, 25% or below, 20% or below, 15% or below or 10% or below, of a full state of charge level. Thereby, a reduced deterioration of the SOH of the at least one electrical energy storage may be avoided since it has been realized that reducing the electrical energy storage SOC to a too low level may be negative for SOH. Still optionally, a SOC safety margin may be such that the at least one electrical energy storage is not reduced to a level of 30% or below, 25% or below, 20% or below, 15% or below or 10% or below, of a full state of charge level.

Optionally, a positioning system of the vehicle may be used for identifying the at least one point of interest along the planned traveling path. Just as a matter of example, the positioning system may be a satellite positioning system, such as a global navigation satellite system (GNSS), comprising global positioning system (GPS), GLONASS, BeiDou (BDS), Galileo etc. The at least one point of interest may therefore be stored as coordinates, longitude and latitude, on a map.

Optionally, the method may further provide an instruction to at least one of the vehicle, the recharging station and the occupant to stop recharging when the first state of charge level has been reached. Thereby, an improved support may be provided for the occupant. Still further, if the instruction is provided to the vehicle and/or the recharging station, the vehicle/recharging station may automatically stop recharging when the first state of charge level has been reached. This may be a convenient way of recharging for the occupant. Still optionally, the method may also, or alternatively, provide an instruction to recharge the at least one electrical energy storage for a predetermined time period corresponding to the time needed for reaching to the first state of charge level.

Optionally, the planned traveling path of the vehicle may be a traveling path which has been entered by the occupant. Still optionally, the planned traveling path may be a traveling path which is identified in that the occupant has travelled along the traveling path at least one time before, such as a frequently driven path. A frequently driven path may for example be the way to work, to school, to a frequently visited location or the like.

Optionally, the method may, if necessary, further provide an advice to the occupant to recharge the at least one electrical energy storage at more than one point of interest for the occupant along the traveling path. Thereby, it may be further avoided to charge the at least one electrical energy storage to a too high SOC level, especially a 100% SOC level, and also it may be further avoided to not reduce the SOC level to a too low level.

Optionally, the method may further provide an instruction to at least one of the vehicle, the recharging station and the occupant to recharge the at least one electrical energy storage to a second state of charge level before the trip along the planned traveling path has commenced. The second state of charge level may be such that the at least one point of interest may be reached, including a safety margin. Optionally, the second state of charge level may also be lower than a 100% state of charge level to thereby avoid an unnecessary SOH deterioration. Still optionally, the second state of charge level may be 95% or less, 90% or less, 85% or less or 80% or less.

Optionally, the method may further store an occupant driving behavior based on how the occupant has followed the provided advices, which in turn relate to the state of health deterioration of the at least one energy storage. Such stored information may be provided to the occupant such that the occupant may learn over time that the occupant's behavior may affect state of health, and in the end the TCO of the electrical vehicle. Moreover, such information may be used for calculating a leasing amount. Thereby, if the vehicle is provided under a leasing contract, a leasing charging plan may be linked to how the vehicle is being used by the occupant. Thus, the driving behavior of the occupant may lead to a reduced cost for using the vehicle. The stored driving behavior may also be used for calculating a cost for a vehicle insurance.

According to a second aspect of the invention, the objects are at least partially provided by a computer program comprising instructions which, when the program is executed by a computer, cause the computer to carry out a method according to the first aspect of the invention. The advantages and effects of the second aspect of the invention are largely analogous to the ones described in relation to the first aspect of the invention. The computer program may for example be implemented into an electrical vehicle, a mobile device, such as a smartphone, in a server of an internet or network based cloud, or in a combination of anyone of the preceding implementations.

According to a third aspect of the invention, the objects are at least partially provided by a system for providing an advice to an occupant of an electrical vehicle comprising at least one electrical energy storage, wherein the system further comprises at least one advice unit for providing an advice to the occupant, wherein the system is configured to:

estimate an energy usage of the at least one electrical energy storage for a planned traveling path of the electrical vehicle between a first and a second location and therefrom determine if there is a need to recharge the at least one electrical energy storage along the planned traveling path, and when there is a need for recharging:

identify at least one point of interest for the occupant between the first and the second location which can be reached by a current amount of electrical energy in the at least one electrical energy storage, wherein the at least one point of interest comprises at least one recharging station, provide an advice to the occupant to stop at the at least one point of interest for recharging the at least one electrical energy storage, and further provide an instruction to recharge to a first state of charge level, wherein the first state of charge level is such that the second location or at least one other point of interest for the occupant along the planned traveling path can be reached with a state of charge safety margin.

Optionally, the first state of charge level may also be lower than a 100%, or full charge, state of charge level.

Optionally, the other point of interest for the occupant may be an other subsequent point of interest along the planned traveling path.

The advantages and effects of the third aspect of the present invention are largely analogous to the advantages and effects of the first and second aspects of the present invention.

Optionally, the at least one point of interest for the occupant may be a predetermined location which has been preselected by the occupant. Thereby, the occupant may beforehand select which type of locations that are preferred and may thereby get a more convenient driving experience when using the vehicle. Still optionally, the method may comprise storing a plurality of points of interests for the occupant as an occupant profile. Thus, the occupant may preselect a plurality of preferred locations, comprising preferred restaurants, shops, place of work etc., which then may be used when identifying points of interest along the planned traveling path. The preferred locations may also be linked to factors such as where the occupant prefers to shop, if the occupant likes coffee, which types of hotels that are preferred, which types of interests the occupant has etc. Still optionally, a plurality of different occupant profiles may be stored in the case the vehicle is used by more than one occupant. Moreover, in this example embodiment, the system may further include a step of identifying which occupant is using the vehicle before identifying a point of interest along the planned traveling path.

Optionally, the at least one point of interest for the occupant may be a predetermined location which has been identified in that the occupant has previously stopped the electrical vehicle at that location. In other words, the system may comprise an adaptive function which may learn over time about the specific occupant behavior. Just as a matter of example, stopping only one time at a specific location may not be enough for storing that location. In one example, the at least one point of interest may be identified in that the vehicle has stopped at the specific location more than one time. Still further, any identified or preselected point of interest may be deselected by the occupant if for instance the occupant has changed his/her behavior over time.

Optionally, the at least one point of interest for the occupant may be a point of interest which has been identified in that an occupant calendar comprises a scheduled meeting/appointment at a specific location. An occupant calendar may be a virtual calendar stored in a memory unit, such as in a memory unit of a mobile device, such as a smartphone or the like. Thereby, an even further improved driving experience may be obtained since the advice provided to the occupant may be linked to the locations corresponding to the scheduled meetings/appointments. Still further, a reduced SOH deterioration may also be obtained.

Optionally, the at least one point of interest may be linked to an occupant shopping list. Such a shopping list may e.g. comprise information regarding different products/supplies that shall be purchased, which in turn may be linked to specific locations where such products/supplies may be purchased. Thereby, the advice provided to the occupant may lead to an even further improved driving experience and a reduced SOH deterioration. The shopping list may for example be stored in a memory unit, such as in a memory unit of a mobile device, such as a smartphone or the like.

Optionally, the system may further be configured to provide a message to the occupant comprising a current and/or a future SOH, wherein the future SOH is based on the planned traveling path. Thereby the occupant may obtain information on the SOH and also a change of SOH based on for example different traveling paths/decisions. This in turn may support the occupant in making better decisions in order to not reduce the SOH more than necessary.

Optionally, the first state of charge level may be 95% or less, 90% or less, 85% or less, preferably 80% or less, of a full state of charge level. Thereby, a reduced deterioration of the SOH of the at least one electrical energy storage may be avoided since it has been realized that charging the electrical energy storage to a too high level may be negative for SOH. Still optionally, the first state of charge level may be such that the second location or the other point of interest along the traveling path can be reached without reducing the state of charge level to a level of 30% or below, 25% or below, 20% or below, 15% or below or 10% or below, of a full state of charge level.

Optionally, the identified at least one point of interest may further be a point of interest which can be reached without reducing the state of charge level to a level of 30% or below, 25% or below, 20% or below, 15% or below or 10% or below, of a full state of charge level. Thereby, a reduced deterioration of the SOH of the at least one electrical energy storage may be avoided since it has been realized that reducing the electrical energy storage SOC to a too low level may be negative for SOH. Still optionally, a SOC safety margin may be such that the at least one electrical energy storage is not reduced to a level of 30% or below, 25% or below, 20% or below, 15% or below or 10% or below, of a full state of charge level.

Optionally, the system may comprise a positioning system which may be used for identifying the at least one point of interest along the planned traveling path. Just as a matter of example, the positioning system may be a satellite positioning system, such as a global navigation satellite system (GNSS), comprising global positioning system (GPS), GLONASS, BeiDou (BDS), Galileo etc. The at least one point of interest may therefore be stored as coordinates, longitude and latitude, on a map.

Optionally, the system may further provide an instruction to at least one of the vehicle, the recharging station and the occupant to stop recharging when the first state of charge level has been reached. Thereby, an improved support may be provided for the occupant. Still further, if the instruction is given to the vehicle and/or the recharging station, the vehicle/recharging station may automatically stop recharging when the first state of charge level has been reached. This may be a convenient way of recharging for the occupant. Still optionally, the method may also, or alternatively, provide an instruction to recharge the at least one electrical energy storage for a predetermined time period corresponding to the time needed for reaching the first state of charge level.

Optionally, the advice unit comprises at least one of a display unit and an audio message unit for providing the advice to the occupant. Still optionally, the advice unit may be integrated into the electrical vehicle and/or provided in a mobile device, such as a smartphone.

Optionally, the system may further be configured to provide an advice to the occupant to recharge the at least one electrical energy storage at more than one point of interest for the occupant along the traveling path. Thereby, it may be further avoided to charge the at least one electrical energy storage to a 100% SOC level, and also it may be further avoided to not reduce the SOC level to a too low level.

Optionally, the system may further provide an instruction to at least one of the vehicle, the recharging station and the occupant to recharge the at least one electrical energy storage to a second state of charge level before the trip along the planned traveling path has commenced. The second state of charge level may be such that the at least one point of interest may be reached. Optionally, the second SOC level may also be lower than a 100% state of charge level to thereby avoid an unnecessary SOH deterioration. Still optionally, the second SOC level may be 95% or less, 90% or less, 85% or less or 80% or less.

Optionally, the system may further be configured to store an occupant driving behavior based on how the occupant has followed the provided advices, which in turn relate to the state of health deterioration of the at least one energy storage. Such stored information may be provided to the occupant such that the occupant may learn over time that the occupant's behavior may affect state of health, and in the end the TCO of the electrical vehicle. Moreover, such information may be used for calculating a leasing amount. Thereby, if the vehicle is provided under a leasing contract, a leasing charging plan may be linked to how the vehicle is being used by the occupant. Thus, the driving behavior of the occupant may lead to a reduced cost for using the vehicle. The stored driving behavior may also be used for calculating a cost for a vehicle insurance.

According to a fourth aspect, the objects are at least partially provided by an electrical vehicle comprising a system according to the third aspect of the present invention. Optionally, the electrical vehicle may be anyone of a HYBRID or PURE electrical vehicle, preferably a PURE electrical vehicle since these vehicles often comprise larger energy storages and therefore the SOH has a larger impact on the residual value of such a vehicle. Still optionally, the electrical vehicle may be anyone of a passenger vehicle, passenger car, road vehicle, truck, bus or the like.

BRIEF DESCRIPTION OF DRAWINGS

Exemplifying and preferred embodiments of the present invention will now be described more in detail, with reference to the accompanying drawings, wherein.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

Figure 1:
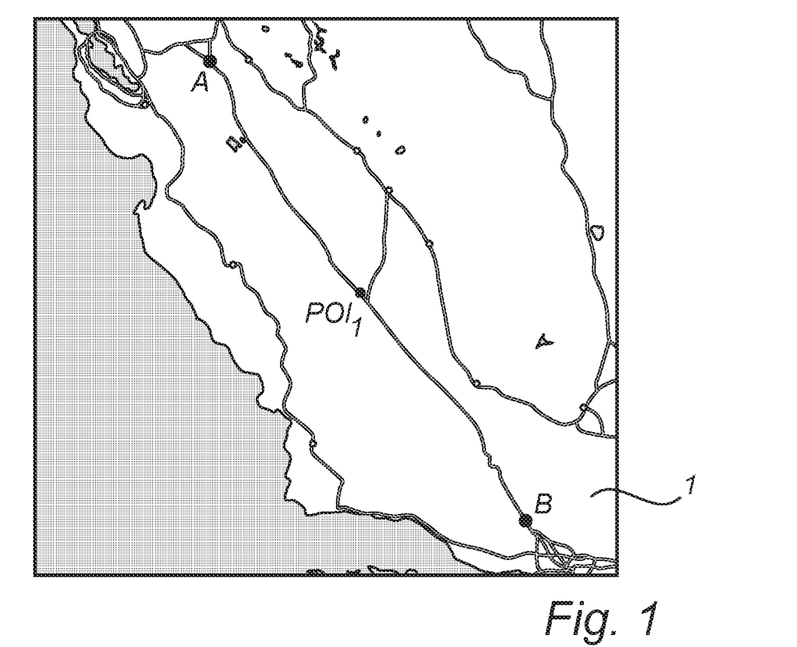
FIG. 1 shows a map comprising a planned traveling path according to an example embodiment of the present invention.

In FIG. 1, a map 1 comprising a planned traveling path according to an example embodiment of the present invention is depicted. The traveling path comprises a first location A where the trip starts and a second location B where the trip may end. In-between A and B, and along the traveling path is a point of interest $POI_1$ for the occupant located, which may be a preferred restaurant, a shop or the like. At the point of interest $POI_1$ is also a recharging station located nearby. During the trip of the electrical vehicle 10 (see FIG. 2) along the traveling path, a method as for example illustrated in FIG. 3 may be used. Here it can be seen that A and B are different locations, but in an example embodiment, A and B may also be the same location, i.e. the trip may be a round trip, where the point of interest is for example a place of work, a restaurant or the like. Still further, in this example it can be seen that the point of interest $POI_1$ is located directly in connection with the road along which the electrical vehicle 10 drives. However, the point of interest $POI_1$ may also be located a certain distance away from the road, such as a few tens of meters, a few hundred of meters or a few kilometers away from the road between A and B. Preferably the point of interest $POI_1$ is located at the road between A and B as indicated in the figure.

Figure 2:
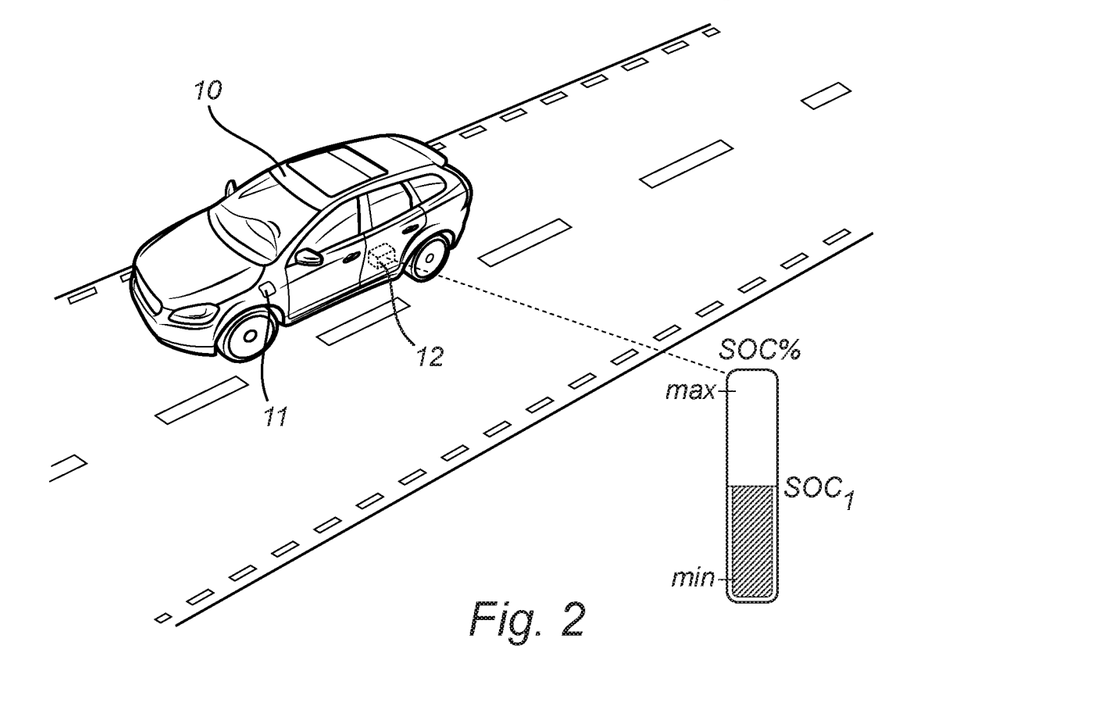
FIG. 2 shows an electrical vehicle comprising a system according to an example embodiment of the present invention.

In FIG. 2, an electrical vehicle 10 comprising a system 14 (see FIG. 4) according to an example embodiment of the present invention is depicted. The vehicle 10 is in this embodiment a PURE electrical vehicle, i.e. only electrical power is used for propulsion of the electrical vehicle 10. The electrical vehicle 10 further comprises at least one electrical energy storage 12, which in a preferred embodiment is a lithium ion battery comprising a plurality of lithium ion battery cells. However, the present invention is not limited only to this type of energy storage, but also other types of energy storages could be used where it is of interest to avoid an unnecessary SOH deterioration. In the figure it can also be recognized that the at least one electrical energy storage 12 has been recharged to a first state of charge level $SOC_1$. In this example, the first state of charge level $SOC_1$ is a level between a maximum and a minimum value, which in a preferred embodiment is from 20% SOC up to 80% SOC. The system 14 may assure that the SOC of the electrical energy storage 12 is always, or in most cases, kept within said interval, or within another suitable interval as disclosed herein. Such other intervals of the SOC level may be any one of the following:

5, 10, 15, or $20 \leq SOC (\%) \leq 80$, 85, 90 or 95

Any one of the aforementioned min. and max. values may be combined.

The electrical vehicle 10 further comprises a connection 11, such as a socket, where an electrical cable may be connected, by e.g. a plug, to the vehicle 10 for recharging the at least one electrical energy storage 12.

Figure 3:
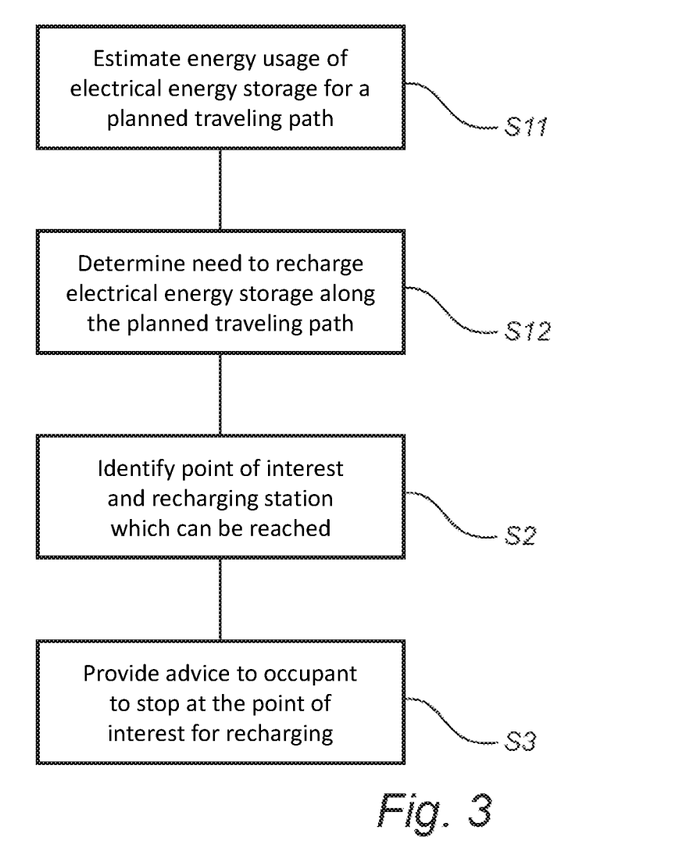
FIG. 3 shows a flowchart of a method according to an example embodiment of the present invention.

In FIG. 3, a flowchart of a method according to an example embodiment of the present invention is depicted. The flowchart illustrates a method for providing an advice to an occupant of an electrical vehicle 10 comprising at least one electrical energy storage 12, wherein the method comprises the following steps:

S11) estimate an energy usage of the at least one electrical energy storage 12 for a planned traveling path for the electrical vehicle 10 between a first A and a second location B and therefrom:

S12) determine if there is a need to recharge the at least one electrical energy storage 12 along the planned traveling path, and when there is a need for recharging:

S2) identify at least one point of interest $POI_1$ for the occupant between the first A and the second B location which can be reached by a current amount of electrical energy in the at least one electrical energy storage 12, wherein the at least one point of interest $POI_1$ comprises at least one recharging station 15 (see FIG. 5), S3) provide an advice to the occupant to stop at the at least one point of interest $POI_1$ for recharging the at least one electrical energy storage 12, and further provide an instruction to recharge to a first state of charge level $SOC_1$, wherein the first state of charge level $SOC_1$ is such that the second location B or at least one other point of interest for the occupant along the planned traveling path can be reached with a state of charge safety margin.

Figure 4:
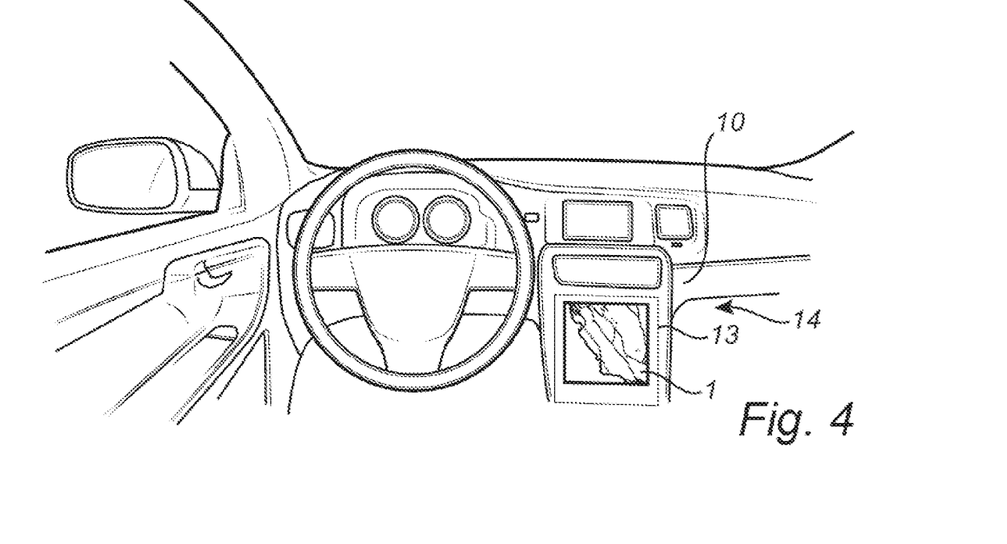
FIG. 4 shows an interior of an electrical vehicle comprising a system according to an example embodiment of the present invention.

In FIG. 4, a vehicle 10 comprising a system 14 according to an example embodiment of the present invention is depicted. The system 14 comprises an advice unit 13 and a processing unit (not shown) for executing a method according to an example embodiment of the present invention. The method is preferably implemented in a computer program. The advice unit 13 is here a display unit inside the vehicle 10. However, as also mentioned above, the advice unit may also be a unit which provides an audio message, especially via loudspeakers of the vehicle 10. On the display unit 13 is a digital map 1 shown which comprises the planned traveling path from A to B and at least one point of interest $POI_1$ therebetween. The system 14 further comprises a positioning system, such as GPS. When the system 14 has recognized that there is a need to stop the vehicle 10 at the point of interest $POI_1$, a visual message may appear on the display unit 13 which states that the vehicle preferably should be stopped at $POI_1$ for recharging. For example, a so called "pop up" window may appear on the display unit 13. It may further be presented to the occupant that the electrical energy storage 12 (not shown) should be recharged to a first state of charge level $SOC_1$ which has been determined according to an example embodiment of the present invention. The occupant may choose to accept or decline the advice. In an embodiment, if the occupant accepts the advice, by e.g. pushing on a virtual accept button on the display unit 13, the system 14 may then guide the occupant to the point of interest $POI_1$. The display unit 13 may thus comprise a touch sensitive screen. Further, the guidance may be performed by the GPS/navigation function of the system 14. The aforementioned functionality may in a similar manner be implemented in a mobile device, such as in a smartphone or the like. Thereby, the occupant may recognize that the trip is more convenient and at the same time an unnecessary SOH deterioration may be avoided.

Figure 5:
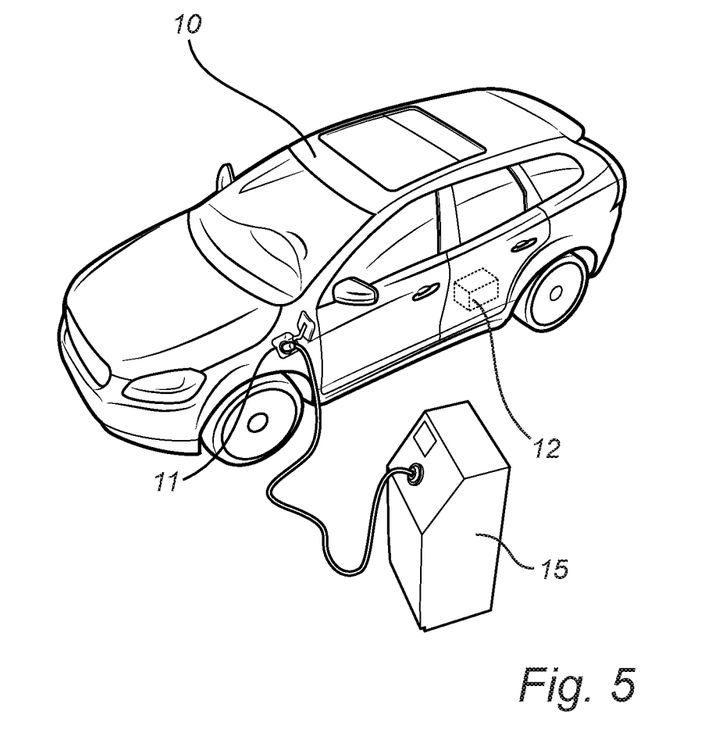
FIG. 5 shows an electrical vehicle according to an example embodiment of the present invention which is connected to a recharging station.

In FIG. 5, a vehicle 10 comprising a system 14 (not shown) according to an example embodiment of the invention is depicted, wherein the vehicle 10 is connected to a recharging station 15 via a connection 11 on the vehicle 10 for charging an electrical energy storage 12. The recharging does not necessarily need to be performed in this manner. As another example, the recharging may be performed by electrical induction, i.e. without a cable connection as shown in FIG. 5. As stated above, the system 14 and the method may provide an instruction to stop recharging when the first state of charge level $SOC_1$ has been reached. This may be accomplished by providing the instruction to the recharging station 15 that it shall stop recharging after a predetermined period of time corresponding to the first state of charge level $SOC_1$. The instruction may also be provided to the vehicle 10 such that it for example further comprises a control unit (not shown) or the like which may assure that recharging ends when the first state of charge level $SOC_1$ has been reached. Thus, a simplified recharging operation for the occupant may be obtained.

The invention is not limited to the embodiments described herein. It would be evident for the skilled person that other embodiments and modifications to the embodiments specified hereinabove are also possible within the scope of the claims. For example, using a virtual map may not be needed. The method and system may still be able to provide an advice to stop at a point of interest for the occupant without visualizing a map to the occupant.

The invention claimed is:

1. A method for providing an advice to an occupant of an electrical vehicle comprising at least one electrical energy storage, wherein the method comprises the following steps:
   identify which occupant of a plurality of potential occupants is using the electrical vehicle;
   estimate an energy usage of the at least one electrical energy storage for a planned traveling path for the electrical vehicle between a first (A) and a second (B) location and therefrom;
   determine if there is a need to recharge the at least one electrical energy storage along the planned traveling path, and when there is a need for recharging;
   identify at least one point of interest (POI1) for the identified occupant utilizing an occupant profile of a plurality of potential occupant profiles and selected based on the identified occupant between the first (A) and the second (B) location reachable by a current amount of electrical energy in the at least one electrical energy storage, wherein the at least one point of interest (POI1) is located proximate at least one recharging station; and
   provide an advice to the identified occupant to stop at the at least one point of interest (POI1) for recharging the at least one electrical energy storage, and further provide an instruction to recharge to a first state of charge level (SOC1), wherein the first state of charge level (SOC1) is such that the second location (B) or at least one other point of interest for the identified occupant along the planned traveling path is reachable with a state of charge safety margin.

2. The method according to claim 1, wherein the at least one point of interest (POI1) for the identified occupant is a predetermined location which has been preselected by the occupant.

3. The method according to claim 1, wherein the at least one point of interest (POI1) for the identified occupant is a predetermined location which has been identified in that the occupant has previously stopped the electrical vehicle at that location.

4. The method according to claim 1, wherein the first state of charge level (SOC1) is 95% or less, 90% or less, 85% or less, preferably 80% or less, of a full state of charge level.

5. The method according to claim 1, wherein the identified at least one point of interest (POI1) is further a point of interest reachable without reducing the state of charge level to a level of 30% or below, 25% or below, 20% or below, 15% or below or 10% or below, of a full state of charge level.

6. The method according to claim 1, wherein a positioning system (GPS, GNSS) of the vehicle is used for identifying the at least one point of interest (POI1) along the planned traveling path.

7. The method according to claim 1, wherein the method further provides an instruction to at least one of the vehicle, the recharging station and the identified occupant to stop recharging when the first state of charge (SOC1) level has been reached.

8. A non-transitory storage medium storing computer program comprising instructions which, when the program is executed by a computer, cause the computer to carry out a method according to claim 1.

9. A system for providing an advice to an occupant of an electrical vehicle comprising at least one electrical energy storage, wherein the system further comprises at least one advice unit for providing an advice to the occupant, and wherein the system is configured to:
   identify which occupant of a plurality of potential occupants is using the electrical vehicle; estimate an energy usage of the at least one electrical energy storage for a planned traveling path of the electrical vehicle between a first (A) and a second (B) location and therefrom determine if there is a need to recharge the at least one electrical energy storage along the planned traveling path such that the second location (B) is reachable, and when there is a need for recharging; identify at least one point of interest (POI1) for the identified occupant based on utilizing an occupant profile of a plurality of potential occupant profiles and selected based on the identified occupant between the first (A) and the second (B) location reachable by a current amount of electrical energy in the at least one electrical energy storage, wherein the at least one point of interest (POI1) is located proximate at least one recharging station; and
   provide an advice to the identified occupant to stop at the at least one point of interest (POI1) for recharging the at least one electrical energy storage, and further provide an instruction to recharge to a first state of charge level (SOC1), wherein the first state of charge level (SOC1) is such that the second location (B) or at least one other point of interest for the identified occupant along the planned traveling path is reachable with a state of charge safety margin.

10. The system according to claim 9, wherein the at least one point of interest (POI1) for the identified occupant is a predetermined location which has been preselected by the occupant.

11. The system according to claim 9, wherein the at least one first point of interest (POI1) for the identified occupant is a predetermined location which has been identified in that the identified occupant has previously stopped the electrical vehicle at that location.

12. The system according to claim 9, wherein the first state of charge level (SOC1) is 95% or less, 90% or less, 85% or less, preferably 80% or less, of a full state of charge level.

13. The system according to claim 9, wherein the identified at least one point of interest (POI1) is further a point of interest reachable without reducing the state of charge level to a level of 30% or below, 25% or below, 20% or below, 15% or below or 10% or below, of a full state of charge level.

14. The system according to claim 9, wherein the system is further configured to provide an instruction to at least one of the vehicle, the recharging station and the identified occupant to stop recharging when the first state of charge level (SOC1) has been reached.

* * * * *